United States Patent [19]

Van Nieuwal et al.

[11] 4,234,030
[45] Nov. 18, 1980

[54] TIRE CARCASS STRUCTURE

[75] Inventors: John G. Van Nieuwal; Edward L. Montgomery; Richard M. Beeghly, all of Cumberland, Md.

[73] Assignee: The Goodyear Tire & Rubber Company, Akron, Ohio

[21] Appl. No.: 934,913

[22] Filed: Aug. 18, 1978

[51] Int. Cl.³ .......................... B60C 9/10; B60C 9/18
[52] U.S. Cl. .......................... 152/354 R; 152/361 R
[58] Field of Search ........ 152/330 R, 354 R, 354 RB, 152/355, 356 R, 357 R, 359, 361 R

[56] References Cited

U.S. PATENT DOCUMENTS

| | | | |
|---|---|---|---|
| 1,581,743 | 4/1926 | Kearns et al. | 152/354 |
| 1,918,553 | 7/1933 | Musselman | 152/354 |
| 2,310,776 | 2/1943 | Gay | 152/356 |
| 2,894,555 | 7/1959 | Bourdon | 152/361 |
| 3,108,628 | 10/1963 | Kraft | 152/354 |
| 3,161,220 | 12/1964 | Beckadolph | 152/356 |
| 3,339,610 | 9/1967 | Fausti et al. | 152/354 |
| 3,363,660 | 1/1968 | Mirtain et al. | 152/356 |
| 3,540,511 | 11/1970 | Mirtain | 152/354 |

*Primary Examiner*—John E. Kittle
*Attorney, Agent, or Firm*—D. M. Ronyak

[57] ABSTRACT

A bias-ply tire having a carcass structure having at least two plies of cord fabric. In at least one ply the cords extend in continuous manner from bead portion to bead portion at an oblique angle relative to the axial direction of the tire. In at least one ply there are two sections of like continuous cord fabric, the cords of which sections are at a substantially equal angle to each other which is oppositely directed relative to the axial direction of the tire. The cords of each section extend from the bead portion near to which each respectively begins into the crown of the tire beyond the circumferential centerline of the tire.

4 Claims, 4 Drawing Figures

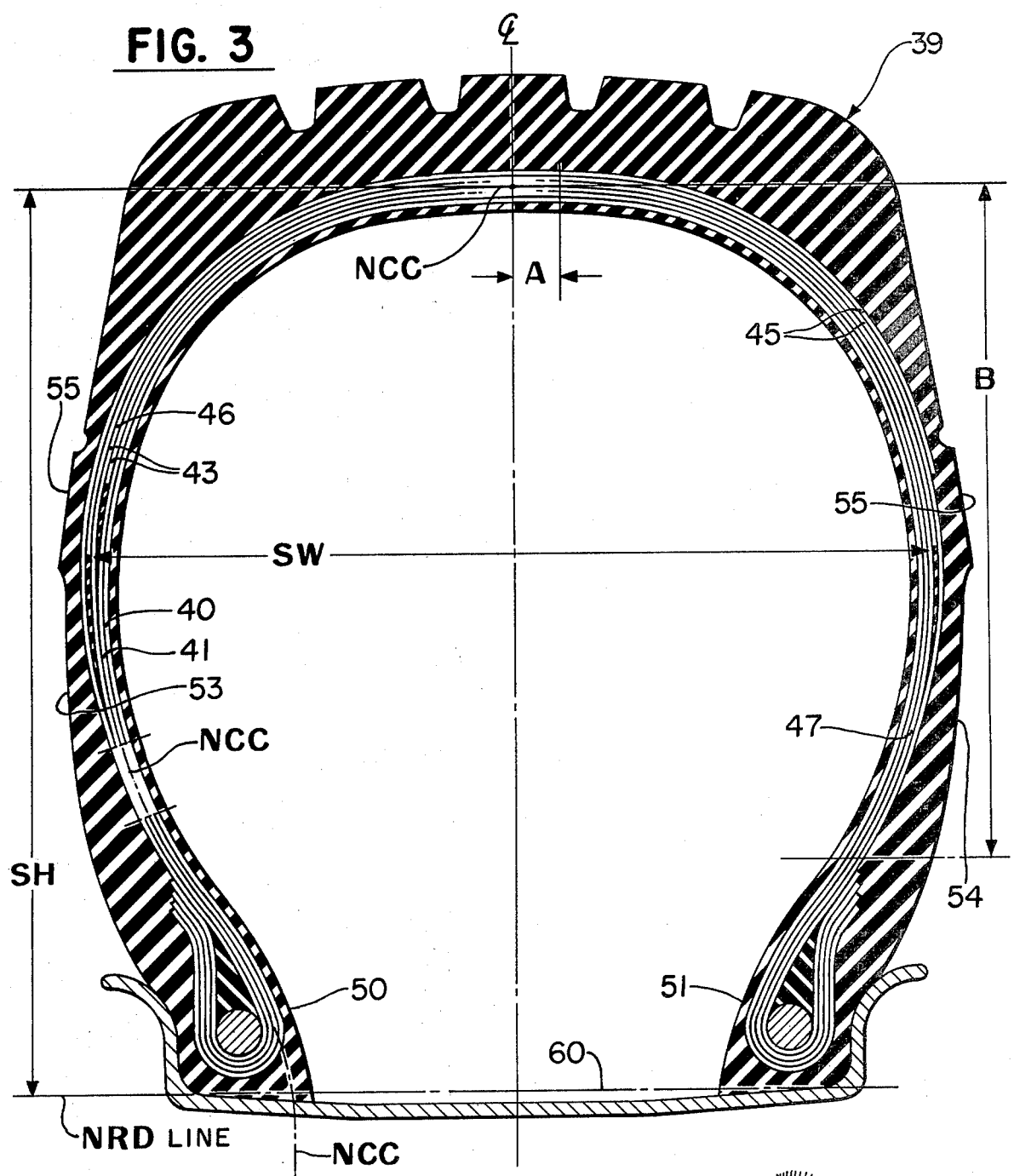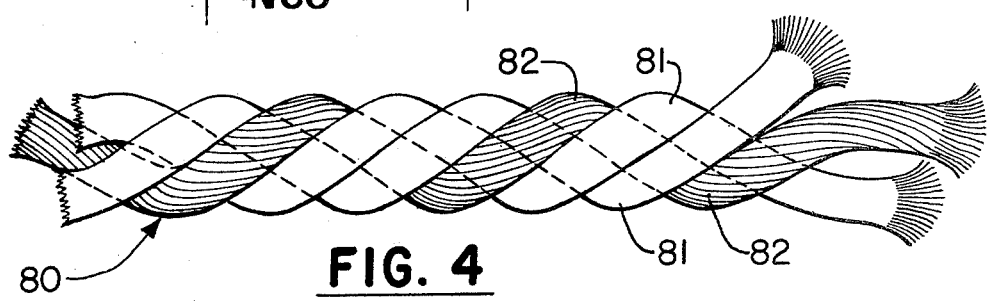

TIRE CARCASS STRUCTURE

BACKGROUND OF THE INVENTION

This invention relates to carcass structures for pneumatic tires, particularly bias ply tires, and tires containing said carcass structures.

Bias ply (also called diagonal ply or cross ply) tires have a carcass formed of layers or plies of cord fabric. The reinforcing cords of each layer extend diagonally across the tire from bead to bead. The bias angle of the cord path relative to the axial direction of the tire (i.e. parallel to the axis of rotation of the tire) is greater than 15 degrees. The cords in known types run in opposite directions in each successive layer (or ply) of reinforcing material, resulting in a criss-cross pattern. Normally, an even number of layers is employed. To further reinforce the tire, additional layers of reinforcing material or plies may be included, these layers overlying the crown area of the tire to further reinforce the tread region. These layers are called "breakers" and the cords of these reinforcements do not extend to the bead portions of the tire.

Wherever herein, the term "bias" or "bias ply tire" is employed, it shall mean a tire in which a majority of the reinforcement of the tire is obtained by bias plies. The contribution of each layer of reinforcements is calculated by taking the number of cords per inch in the cured tire (measured perpendicularly to the longitudinal axis of the cords) times the strength per cord times the number of layers. This computation is done with respect to the cord arrangement at substantially the circumferential centerline of the cured tire.

A second type of tire construction is the radial tire. In a radial tire one or more plies of reinforcing cords extend transversely or approximately transversely from bead portion to bead portion. Radially outward of the ply or plies under the tread is an inextensible belt composed of one or more layers of cords, the angles of the belt cords being relatively low, for example, 10 to 30 degrees with respect to the circumferential direction of the tire. These belts act to restrict the axially directed carcass ply cords. The present invention is not directed to tires of the radial type.

As previously stated, when additional strength is required in the crown area of bias tires, additional cord fabric layers (breakers) are laid over the plies whose cords extend from bead portion to bead portion. Application of these layers involves additional labor and time at the building station, thereby reducing productivity and increasing the cost of such tires. Furthermore, because the cords of such additional layers (breakers) are not restrained by the beads of the tire, the cords of these breakers are free to move upon shaping of the tire from a cylindrical form to its completed form. Such movement, when irregular, may result in a defective tire.

It is, therefore, an object of this invention to provide a bias ply vehicle tire which will overcome the above-mentioned drawbacks.

It is another object of this invention to provide a bias ply pneumatic tire containing additional layers of reinforcing cords in its crown area without requiring the separate addition of such reinforcement layers at the building machine.

It is a still further object of this invention to provide a bias ply pneumatic vehicle tire in which the reinforcing cords of the additional layers in the crown area thereof are anchored near the bead portions of the tire thereby reducing or eliminating movement of the cords thereof during shaping of the tire.

Other objects will become apparent as the description proceeds.

SUMMARY OF THE INVENTION

According to the present invention, a bias ply pneumatic vehicle tire having a carcass of rubberized cord fabric, sidewalls overlying the lateral portions of the carcass and terminating in respective bead portions at the radially innermost ends thereof, and a tread overlying the carcass in the crown area of the tire, has in its carcass, at least one ply of fabric the cords of which run continuously from bead portion to bead portion at an oblique angle greater than 15 degrees relative to the axial direction of the tire and at least one sectional ply the cords of which having an oppositely directed oblique angle greater than 15 degrees relative to the axial direction of the tire. The sectional ply is composed of two sections each of continuous cord fabric, one section beginning at one bead section and extending into the crown of the tire beyond the circumferential centerline thereof; the other section beginning at the other bead portion and extending into the crown of the tire beyond the circumferential centerline thereof.

BRIEF DESCRIPTION OF THE DRAWINGS

The objects, characteristics, and advantages of the present invention will be more clearly understood by reference to the following detailed description when taken in conjunction with the accompanying drawings in which:

FIG. 3 is a diagrammatic view, in partial radial section, of yet another tire according to the invention, showing thereon the relationship of the reinforcements to parameters of the tire; and FIG. 4 is a greatly enlarged view of a twisted, merged cord suitable for use with the tire of FIG. 3.

Referring now to FIG. 1, the tire 10 comprises a tread 11 overlying the crown region thereof, sidewalls 13,14 adjoining the marginal regions of the tread and overlying the lateral portions of the carcass 16 and terminating at their radially inward ends in a pair of bead portions 18,20. The carcass 16 is formed of two plies 22,24 of reinforcing cords. A continuous ply 22 has cords which run continuously from bead portion 18 to bead portion 20 at an oblique angle which is greater than 15 degrees relative to the axial direction of the tire. This is also shown in FIG. 2. The sectional ply 24 is composed of two sections 25,26 of like continuous cord fabric. The cords of one section 25 of the sectional ply 24 begin at a first bead portion 18 and extend radially outward through a first sidewall 13 and into the crown of the tire to a termination point underlying a first margin of the tread 11 of the tire. The other section 26 of the sectional ply 24 begins at the other or second bead portion 20 and extends radially outward through the other sidewall 14 and into the crown of the tire to a termination point underlying the opposite margin of the tread 11. The ends 27,28 of the respective sectional ply sections 25,26 which are not anchored near the bead portions terminate substantially equidistantly from the circumferential centerline C/L of the tire.

FIG. 3 illustrates the use of the invention in the construction of a heavy service truck tire 39. Each of plies 40,41 is similar to the continuous ply 22 of FIGS. 1 and 2. The cords of plies 40,41 run continuously from bead portion to bead portion and from an oblique angle greater than 15 degrees relative to the axial direction of the tire at its circumferential center line C/L. Each of plies 43,45 is similar to sectional ply 24 of FIGS. 1 and 2. Each of plies 43,45 is composed of two sections of like continuous cord fabric. The cords of one section 46 of ply 43 begin at a first bead portion 50 and extend into the crown of the tire beyond the circumferential centerline C/L thereof and into the sidewall 54 opposite the bead portion 50 near to which they begin to a termination point which corresponds substantially with the maximum carcass sectional width SW of the tire. The cords of the other section 47 of ply 43 begin at the other bead portion 51 and extend into the crown beyond the circumferential centerline C/L of the tire to a termination point in the sidewall 53 opposite that of the bead portion 51 near to which they begin. The point of termination of the cords of the two sections of any such sectional ply are substantially equidistant from the centerline C/L of the tire. The angles of the cords of the two sections of any such sectional ply, e.g. of sections 46,47 of sectional ply 43, with respect to the circumferential direction of the tire are substantially identical. The same cord fabric preferably is used for all plies.

Figure 1:
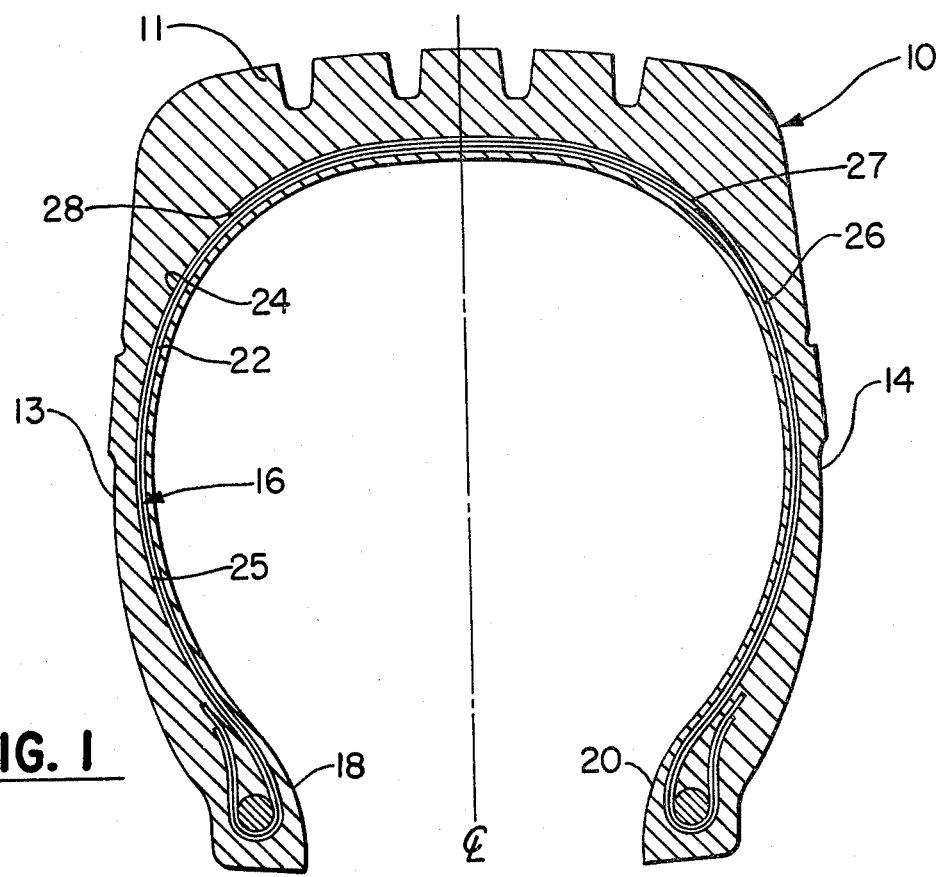
FIG. 1 is a diagrammatic view, in partial radial section, of a tire according to the present invention.
Figure 2:
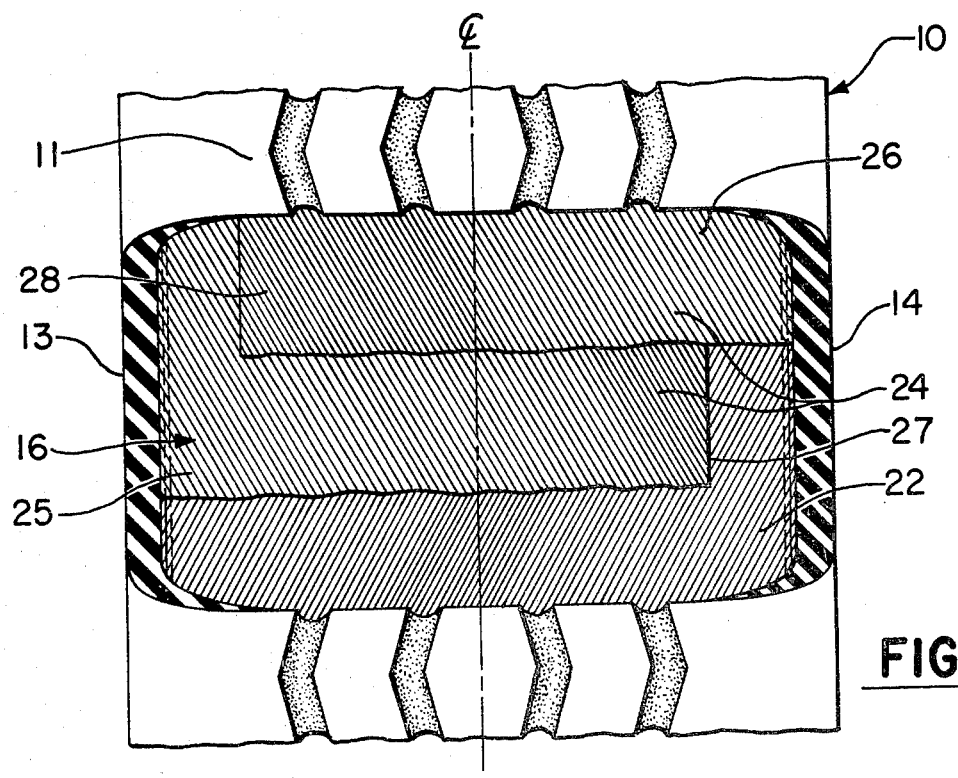
FIG. 2 is a top view upon the tread surface of the tire of FIG. 1, with portions broken away to show the arrangement of the reinforcements in the crown of the tire.

Although in FIGS. 1 and 2, the continuous ply 22 and in FIG. 3 the continuous plies 40,41 are shown to be disposed radially inwardly of the sectional ply 24 of FIGS. 1 and 2 and sectional plies 43,45 of FIG. 3, this need not be the case. Any continuous ply can lie radially outwardly of any sectional ply. Also, the sections 25,26 of sectional ply 24 of FIGS. 1 and 2, and e.g. 46,47 of sectional ply 43 of FIG. 3, can lie on opposite sides of any continuous ply (24 in FIGS. 1 and 2; 40,41 of FIG. 3). It is preferred, however, that the sections of any given sectional ply lie on the same side of any adjacent ply and further, that the sectional ply or plies lie radially outward of the single ply or plies.

A tire having a carcass according to the invention may additionally contain other layers of reinforcing cord fabric such as are used in known tire constructions, to the extent they do not interfere substantially with the performance of the advantages offered by the tire of the present invention.

The termination point of the cords of a section of any such sectional ply beyond the circumferential centerline C/L of the tire section should not exceed 75 percent of the tire carcass sectional height SH. The maximum amount that the cords of said sectional ply sections may extend beyond the circumferential centerline into the sidewall opposite that bead portion near to which they are anchored is shown in FIG. 3 as distance B. If multiple sectional plies are used, their endings are preferably offset or staggered as shown in FIG. 3 to minimize stresses and premature failure of the tire.

The minimum distance at which the cords of any sectional ply section should terminate beyond the circumferential centerline in the crown of the tire is shown in FIG. 3 as distance A; that is, not less than two percent (2%) of the maximum tire carcass sectional width SW.

It is desirable that each sectional ply section terminate at a point near the maximum sectional width SW of the tire carcass in the sidewall opposite the bead portion to which it is attached. Near the maximum tire carcass sectional width SW there is normally included in each tire sidewall a curb or scuff rib 55 which protects the respective tire sidewall 53,54 against damage should it come in contact with highway curbs, debris, etc. It is desirable that each sectional ply section terminate at a point corresponding to the location of the curb or scuff rib.

"Maximum tire carcass section height", SH, as used herein, is the maximum radial distance between the neutral carcass contour NCC of the carcass structure beneath the tread portion and a line NRD parallel to the axis of rotation of the tire. Line NRD is located radially outwardly from the axis of rotation of the tire an amount corresponding to one-half the nominal rim diameter of the tire as specified by the tire manufacturer in accordance with the standards set out by The Tire and Rim Association, Inc. In a tire structure having a plurality of plies the measurement of maximum tire carcass section height SH or maximum tire carcass sectional width SW is taken using the neutral carcass contour NCC which is located midway between the outermost and innermost carcass plies, shown by a dotted line in FIG. 3. The maximum tire carcass sectional width SW of the tire carcass is the maximum axial distance measured parallel to the axis of rotation of the tire between the neutral carcass contour NCC in opposite sidewalls 53,54. All measurements are to be taken on an unloaded tire, inflated to design inflation pressure as specified by the tire manufacturer, which tire is mounted on a rim of design type and width as determined in accordance with the standards of The Tire and Rim Association, Inc.

In a tire according to the invention, the plies are formed of cord fabric. In cord fabric the strength is in the warp and the filling serves only to hold the warp cords in position for processing. The filling yarns are normally broken during tire molding. Cord fabrics are to be distinguished from square woven fabrics in which both the warp and the filling yarns or cords are of substantial strength within a given tire. All plies are preferably formed from the same fabric, however, different fabrics may be used for succeeding plies. The two sections of any sectional ply are of the same fabric to prevent loss of symmetry of the tire about its circumferential centerline C/L.

In the construction of a heavy truck tire 39 similar to that shown in FIG. 3, the cords of each of the plies or ply sections were formed of a merged cord. This cord 80 (refer to FIG. 4) was manufactured by twisting singles yarns 81 of 1260 denier nylon 6,6 to 8 turns per inch (3.15 turns per centimeter) in the Z-direction, and twisting an aramid yarn 82 of 1500 denier 12 turns per inch (4.72 turns per centimeter) in the Z-direction. Two of the twisted yarns 81 of nylon were then plied with a single aramid yarn 82 to form a cord 80 having a twist of 8 turns per inch (3.15 turns per centimeter) in the S-direction. Cords of this construction were woven into a fabric containing 21 ends per inch (8.27 ends per centimeter) of fabric width. End count is determined by counting perpendicular to the longitudinal axis of the warp cords. This fabric was treated with an RFL adhesive and normalized through exposure in a heated environment under controlled tension. The resultant fabric had a tensile breaking strength per individual cord of 93 pounds force (42.2 kgf) and a load of 4.4 pounds force (2.0 kgf) was required to elongate the cords 1 percent. The physical properties of the cord were measured at 75 degrees F. (23.9° C.) and 55 percent relative humidity using an Instron tester equipped with air-actuated model 4-C clamps, at a gauge length of 10 inches (25.4 cm) using a crosshead separation speed of 12 inches per minute (30.5 cm per minute).

A heavy truck tire such as that shown in FIG. 3 may be constructed of cord fabric having sufficient strength per unit width. The merged cord as described hereinabove has been successfully employed.

It is believed that fabrics suitable for use with the invention may be formed of any tire cord material suitable for use in known bias ply tires including by way of example but not by way of limitation, rayon, nylon, polyester, and aramid. The choice of fabric is made according to known design criteria.

It is understood that the foregoing description of the preferred embodiments of the present invention is for purposes of illustration only, and that the various structural features and tire constructions herein disclosed may be modified in a number of ways without departing from the spirit and scope of the present invention as defined in the hereto appended claims.

What is claimed is:

1. A bias ply pneumatic tire comprising:
   (a) a carcass of rubberized cord fabric;
   (b) annular bead portions;
   (c) sidewalls overlying lateral portions of said carcass and terminating at their radially innermost ends of the respective bead portions; and
   (d) a tread overlying the carcass in the crown area of the tire, said carcass comprising at least one continuous ply of cord fabric, the cords of which begin near one bead portion and extend continuously from said one bead portion to the other bead portion near to which they terminate, the cords of each said continuous ply extending at an oblique angle relative to the axial direction of the tire, and at least one sectional ply of cord fabric the cords of which extend at an oppositely directed oblique angle relative to the axial direction of the tire, said sectional ply being composed of two sections of like continuous cord fabric, the cords of said sections being of substantially identical angle, one section beginning near one bead portion and extending into the crown beyond the circumferential centerline of the tire and terminating beyond said centerline an amount not exceeding three-fourths of the tire carcass sectional height, the other section beginning near the other bead portion and extending into the crown beyond the circumferential centerline of the tire an amount substantially equal to said one section, the sections of each sectional ply lying on the same side of any adjacent ply, each sectional ply lying nearer to the tread than any said continuous ply.

2. A bias ply pneumatic tire comprising:
   (a) a carcass of rubberized cord fabric plies;
   (b) a pair of annular bead portions;
   (c) a tread overlying the carcass in the crown area of said tire;
   (d) a pair of sidewalls joining the tread at its marginal edges and overlying the lateral portions of said carcass and extending radially inwardly of the axially outer edges of said tread portion and terminating in respective bead portions at their radially innermost ends; and
   (e) said carcass including a plurality of continuous plies of cord fabric the cords of which begin near one bead portion and extend in continuous manner to the other bead portion near to which they terminate, the cords of each of said continuous plies extending at an oblique angle relative to the axial direction of said tire, and at least two sectional plies of like cord fabric the cords of each of which extend at an oblique angle relative to the axial direction of said tire, each said sectional ply being composed of two sections of like continuous cord fabric, one section of each said sectional ply beginning near one of said bead portions and extending through the respective adjoining sidewall to its termination at a point lying beyond the circumferential centerline of the tire but not exceeding three-fourths of the maximum tire carcass section height into the sidewall opposite the bead portion near to which it begins, the other section of the same respective sectional ply beginning at the other bead portion and extending through the respective adjoining sidewall to its termination at a point lying beyond the circumferential centerline of the tire but not exceeding three-fourths of the maximum tire carcass section height into the sidewall opposite the bead portion near to which it begins, said point of termination of each of said sections being substantially equi-distant from the circumferential centerline of said tire, said sectional plies lying nearer to said tread than said continuous plies, the sections of each respective sectional ply lying on the same side of any adjacent ply, the cords of both sections of any sectional ply being of substantially identical angle, the cords of any two adjacent plies whether sectional or continuous being of oppositely directed oblique angles relative to the axial direction of the tire.

3. A pneumatic tire according to claim 1 or 2, wherein each section of said sectional ply extends beyond the circumferential centerline of the tire into the sidewall opposite the bead portion near to which it begins and terminates at a point substantially corresponding to the maximum tire carcass sectional width.

4. A pneumatic tire according to claim 1 said tire further including a curb rib, or wherein each section of said sectional ply extends beyond the circumferential centerline of the tire into the sidewall opposite the bead portion near to which it begins and terminates at a point substantially corresponding to the curb rib of the tire.

* * * * *

UNITED STATES PATENT AND TRADEMARK OFFICE
CERTIFICATE OF CORRECTION

PATENT NO. : 4,234,030
DATED : November 18, 1980
INVENTOR(S) : John G Van Nieuwal et al It is certified that error appears in the above-identified patent and that said Letters Patent are hereby corrected as shown below:

Column 3, line 7, "from" should be -- form --.

Claim 4, line 1, after 1, insert -- or 6 --;

line 2, delete "or".

Signed and Sealed this

Seventh Day of July 1981

[SEAL]

Attest:

RENE D. TEGTMEYER

*Attesting Officer*  *Acting Commissioner of Patents and Trademarks*